United States Patent [19]

Schlichthorst

[11] Patent Number: 4,766,829

[45] Date of Patent: Aug. 30, 1988

[54] CATAMARAN-TYPE MARINE CRAFT

[75] Inventor: Norbert Schlichthorst, Beckdorf, Fed. Rep. of Germany

[73] Assignee: Blohm + Voss AG, Hamburg, Fed. Rep. of Germany

[21] Appl. No.: 863,148

[22] Filed: May 14, 1986

[30] Foreign Application Priority Data

May 17, 1985 [DE] Fed. Rep. of Germany ....... 3517862

[51] Int. Cl.⁴ ................................................ B63B 1/00
[52] U.S. Cl. .................................... 114/61; 114/67 A; 180/126
[58] Field of Search ....................... 114/61, 65 R, 67 A, 114/77 A, 77 R, 78, 79 R, 56, 355, 356; 180/116, 126

[56] References Cited

U.S. PATENT DOCUMENTS

| | | | |
|---|---|---|---|
| 2,091,264 | 8/1937 | Berry | 114/61 X |
| 2,322,790 | 6/1943 | Cristadoro | 114/67 A |
| 2,405,115 | 8/1946 | Creed | 114/61 |
| 4,069,634 | 1/1978 | Bouter et al. | 180/116 X |
| 4,174,671 | 11/1979 | Seidl | 114/61 |
| 4,237,992 | 12/1980 | Bristow | 180/116 |
| 4,397,366 | 8/1983 | Eldridge et al. | 180/116 |

FOREIGN PATENT DOCUMENTS

| | | |
|---|---|---|
| 1002779 | 8/1965 | United Kingdom . |
| 1031951 | 6/1966 | United Kingdom . |
| 1260831 | 1/1972 | United Kingdom . |
| 1336591 | 11/1973 | United Kingdom . |

Primary Examiner—Galen L. Barefoot
Assistant Examiner—Paul E. Salmon

[57] ABSTRACT

A catamaran-type air cushion craft has two floats (211) arranged spaced apart parallel to one another which are connected together at the top by a connecting structure which carries built-in structures and which is sealed at the bottom by an air-tight transverse deck (216). The connecting structure includes at least two double transverse trussed girders (217) arranged spaced apart behind one another, which at least partially contain transverse hollow cavities (212) for passageways and line accomodating hollow cavities (213, 213'), with containers (214) and longitudinal passage and supply elements (215) being mounted at the front and/or rear sides of the double transverse trussed girders.

37 Claims, 12 Drawing Sheets

CATAMARAN-TYPE MARINE CRAFT

BACKGROUND OF THE INVENTION

The invention relates to a catamaran-type marine craft comprising two floats arranged spaced apart and parallel to one another which extend in the direction of travel and which are connected together at the top by a connection structure which carries built-in structures and which is sealed at the bottom by a transverse deck. The invention can fundamentally also be used with multiple hulled marine craft with more than two floats.

In particular the invention relates to a catamaran-type air cushion craft comprising two floats arranged spaced apart parallel to one another which extend in the direction of travel, with the cross-section of the floats broadening from the bottom to the top and with the floats being connected together at the top by a deck structure; resilient skirts arranged at the stem and at the stern between the floats, with the skirts extending at least approximately to the water surface and bounding, together with the floats, an inert chamber between the base of the deck structure and the surface of the water; main propulsion units which drive thrust means disposed in the stern region of the floats; and fans which blow air sucked from the outside into the bounded air chamber beneath the floor of the deck structure to lift the marine craft from travel in the displacement mode to travel in the air cushion mode.

Such marine craft are particularly suited for air cushion operation because the floats or catamaran hulls, which are still somewhat submerged during travel in the air cushion mode, represent a trouble-free sealed lateral boundary of the air chamber for the air cushion, so that resilient skirts only need to be arranged at the stem and at the stern between the floats to additionally bound the relevant air chamber towards the stem and the stern.

The disadvantage of such known catamaran air cushion craft (Naval Engineers Journal, May 1984, pages 77 to 93) is the fact that they are primarily laid out for ideal air cushion operation whereas travel in the displacement mode represents, in the final resort, an undesired state of travel adopted for example only during manoeuvring in harbour, on failure of the air cushion drive or in heavy seas, and which is only provided because it cannot be avoided in the cited circumstances.

In a known catamaran-type air cushion craft the floats have a significantly broadened hull section, which is in particular broadened out in step-like manner and which extends along a substantial fraction of their total length, substantially above the displacement float region which is submersed during travel in the displacement mode. The significantly broadened hull section serves to accommodate the main propulsion units, with the deck structure being attached to the top end region of the broadened hull sections. In this way it is ensured that trouble in the displacement mode is a state of travel of equal value to travel in the air cushion mode in which ideal conditions are present both from the point of view of economy and from the point of view of stability and travel comfort. An ideal behaviour of a catamaran-type air cushion marine craft also in the displacement mode of travel is of particular significance when the marine craft is used as a warship, because the sinking of the marine craft from travel in the air cushion mode into the displacement mode makes it more difficult to locate from a distance.

The present invention now seeks to provide a catamaran-type marine craft which has a particularly stable connecting structure which is stiff against all the forces which occur due to movement of the sea, in particular bending and torsional forces, and which, in addition to its function as a basic stabilising body for the entire marine craft, also makes it possible to carry all the important built-in structures of the marine craft which are not accommodated in the floats, which are in particular especially broad at the top, in a simple but nevertheless reliable manner.

The marine craft of the invention should be extremely economical to manufacture, to operate, to convert and to repair, should require only a small crew, should have good seagoing ability and should also be able to stay for a relatively long time at sea. The range should at least correspond to medium requirements. A broad speed spectrum with a large variation in displacement should also be ensured. The draft of the marine craft should be average to small. The invention is in particular intended for catamaran-type marine craft up to a displacement of approximately 600 tons.

In order to satisfy this object the invention provides that the connection structure includes at least two double transverse trussed girders arranged spaced apart behind one another which contain, at least in part, transverse hollow cavities for passageways and line accommodating hollow cavities, with containers and longitudinal passage and supply elements being bounded at the front and/or rear sides of the double transversed trussed girders.

The thought underlying the invention is thus to be seen in the fact that the two floats are not as it were stably connected with one another by complete deck structures but instead by quite special double transverse trussed girders which however, apart from the function of accommodating all the forces which occur at and between the floats, also have hollow cavities for transverse passageways and take on a further function in that they carry the containers and longitudinal passage and supply elements which are suspended between them.

Under a double transverse trussed girder in the sense of the invention a trussed girder should be understood which consists of two single transverse trussed girders arranged at a small distance in the longitudinal direction of the ship and rigidly connected together, with the width and the height of the double transverse trussed girders being such that a transverse passage appropriate to the size of average people can be arranged in the interior. This double construction results, on the one hand, in excellent stability of the marine craft against bending and twisting forces and provides, on the other hand, a hollow cavity extending in the transverse direction in which it is possible to accommodate not only passageways through which people can walk but also hollow cavities for the laying of lines which must be laid between the two floats, or also lead from the floats or containers to the bridge or to other units within the marine craft.

Because of the high bending and torsional stiffness of the double transverse trussed beams it is sufficient, in accordance with a particular preferred embodiment, for the connecting structure to include single transverse trussed beams arranged between at least some of the double transverse trussed beams. As the single transverse trussed beams are lighter and less complicated to manufacture it is possible in this way to manufacture a very stable ship's hull with reduced weight and cost.

It is particularly advantageous if a double transverse trussed girder and a single transverse trussed girder are arranged alternately in the longitudinal direction between the floats.

For the economical manufacture of air cushion craft in accordance with the invention it is expedient if the longitudinal spacings between sequential transverse trussed girders are made the same. In this way standardised containers can be arranged at any desired positions between the transverse trussed girders and can, if necessary, also be interchanged. This embodiment thus enables in particular the economical manufacture of series ships with a modular construction.

The construction is preferably such that the containers and the longitudinal passage and supply elements are mounted at the front and rear sides in each case to a transverse trussed girder. All the container and longitudinal passage and supply elements are thus suspended, in accordance with the invention, at the connection structure at only two sides which is useful for economical installation and removal and which considerably reduces the cost and effort of securing these components.

More economical installation and removal is also served by a further embodiment which is characterised in that the containers and the longitudinal passage and supply elements are insertable from at least one side in the transverse direction into their position between two transverse trussed girders. In this manner the ship's hull consisting of the floats and transverse trussed girders can be completed as a crude structure while the containers and the passage elements are manufactured in parallel at other places of manufacture. After the basic hull of the ship has been completed then, in accordance with the present preferred embodiment, all the built-in structures can be introduced and installed into the basic ship's hull in the shortest possible time.

It is expedient for good bending stiffness and connection stiffness for each transverse trussed girder to have a top chord, a bottom chord and trusses or struts arranged therebetween. In order to provide the required passageways in the longitudinal direction of the ship and to simultaneously ensure good stability each transverse trussed girder should have, in accordance with a further preferred embodiment of the invention, trussed sections and passage sections.

In order to be able to exploit the entire height between the top and bottom chords for the arrangement of passages which can be walked through, line carrying passages are expediently provided in the top and/or bottom chords so that the lines can be laid between the top and bottom chords outside of the intermediate space.

As already mentioned the double transverse trussed girders are expediently assembled from two single transverse trussed girders which are spaced apart in the longitudinal direction of the ship. In this arrangement the single transverse trussed girders are preferably identical with the single transverse trussed girders which are arranged between each double transverse trussed girder. This makes economical manufacture of both the single and double transverse trussed girders possible.

In order to realise torsionally stiff double transverse trussed girders, which can however be walked through, longitudinal connectors are provided at transverse intervals at the top and at the bottom between the single transverse trussed girders which jointly form the double transverse trussed girder.

Furthermore, the invention envisages, for the provision of a particularly torsionally stiff basic ship's hull, that sequential transverse trussed girders are rigidly connected together by longitudinal girders or beams. The longitudinal girders are in this arrangement expediently arranged in each case only at the top and at the bottom in such a way that the containers and longitudinal passage and supply elements can be inserted between them from the side. In this manner the longitudinal girders can also be fixedly installed before the built-in structures are introduced. A basic ship's hull which resists all loadings due to sea motion is thus realised in this way before any passage elements or containers are introduced.

In order to improve the stability of the basic hull removable vertical support are arranged, in accordance with a further embodiment, between the upper and lower longitudinal girders at the sides. The installation and removal of the passage elements and containers from the side is made possible by the removability of the vertical supports.

In an air cushion marine craft the lowermost deck which merely serves for sealing is also made air- and gas-tight.

Although intermediate decks and longitudinal transverse walls could fundamentally be built into the marine craft of the invention, it is however preferred, and an important feature of the invention, for no form of decks to be provided in the connection structure other than the lowermost transverse deck which merely serves for sealing, in particular air-sealing, and eventually intermediate floors arranged at only quite specific positions between the containers and the longitudinal passage and supply elements, and/or for no form of longitudinal walls and/or transverse bulkheads to be provided in the connection structure, other than eventually at certain specific positions between the containers and the longitudinal passage and supply elements.

The basic hull thus in practice represents a fundamental skeleton which is stable in every manner into which the containers, passage and pipe elements are suspended preferably damped against oscillation and shock.

The connection structure is preferably sealed off in water-tight manner at the sides, at the stem and at the stern by panels. The mentioned basic skeleton is thus permeable in the interior in the transverse longitudinal and vertical directions and is merely sealed off at the outer surfaces by the panels and also at the top and bottom by transverse decks.

An advantageous further development of this embodiment is characterised in that the side panels are so subdivided that they can be removed sectionwise for the introduction or removal of the containers and the longitudinal passage and supply elements from the side.

The catamaran-type marine craft of the invention is preferably so constructed that the floats have an inwardly directed projection in the upper region on which the transverse trussed girders and the lowermost deck are braced only right at the top.

This arrangement should in particular be so contrived that the projection is, at a maximum, approximately equally as wide or slightly less wide than the broadest part of the float which lies beneath it.

This embodiment is of particular significance because a relatively large width is available here for the connection of the transverse trussed beams with, in particular, the transverse bulkheads of the floats or hulls, which is of assistance for the stability of the whole ship's hull. In particular the free space between the floats which still has to be bridged by the transverse trussed beams is considerably reduced by this construction.

A preferred dimensional rule for achieving a particularly good connection and stability is characterised in that the projection is at a maximum approximately just as wide as or somewhat less wide than the broadest position of the part of the float lying beneath it. In order to accommodate as large a part as possible of the forces which occur between the floats in the region above the floats at least one trussed section and one longitudinal passage section are provided, in accordance with a preferred embodiment of the invention, at the side vertically above the associated float.

A particularly favourable ratio between the width of the support surface on the floats and the space between the floats then exists when from 40 to 55%, in particular 45 to 50% of the length of each transverse trussed girder is arranged in the region above the intermediate space between the floats, with the rest vertically above the floats.

If the marine craft of the invention is to have a higher superstructure then upper, double or single transverse trussed girders can, in accordance with a particularly preferred embodiment, be mounted on the transverse trussed girders and be of similar design but however shorter.

In this arrangement the invention expediently provides that the shorter, upper, double and single transverse trussed girders are still so long that they extend into the region vertically above the floats. The upper transverse trussed girders are thus supported in their end regions vertically on the floats via the transverse trussed girders which lie beneath them, which serves for the transmission of forces in a manner which does not load the individual components and welded connections to too great a degree.

Transverse running rails for the running in and running out, and optionally for the securing of the containers and/or the longitudinal passage and supply elements are, in accordance with a further embodiment, provided at the front and/or stern sides of the transverse trussed girders for the simple introduction of the containers and other elements from the side.

In connection with this embodiment the containers and/or the longitudinal passage and supply elements should be provided with liftable and lowerable running rollers for the associated transverse rails.

Although simple catwalks could fundamentally be installed in the double transverse trussed girders, so that they can be walked through it is however preferred for the double transverse trussed girders to contain transverse passageways which are preferably closed on all sides. In other words tube-like passageways which can be walked through and which are closed on all sides are built-into the double transverse trussed girders.

In order to obtain problemfree transitions between transverse and longitudinal passages at the desired positions longitudinal passageway connections are arranged, in accordance with a preferred further development of the invention, at the transverse passageways in the region of the longitudinal passage sections. With this arrangement longitudinal passageways are expediently attached to the longitudinal passageway connections.

In order to obtain access to containers which are capable of being walked through from the individual passageways, openings to adjoining containers should, in accordance with a preferred embodiment of the invention, branch off from the transverse passageways and/or from the longitudinal passageways.

The container openings are expediently constructed as passage elements. In particular, these passage elements should be resiliently constructed or arranged to ensure the required play for movement.

While the horizontal communication paths are formed in or between the transverse trussed girders, vertical communication paths are provided, in accordance with a preferred further development of the invention, between containers which are arranged above one another and which for this purpose preferably have appropriate openings at the top or at the bottom through which for example ladders or stairways can be passed.

It is of particularly significance in connection with the present invention, for the containers, the transverse passageways and the longitudinal passageways to be resiliently suspended on the transverse trussed girders. The construction of a marine craft in accordance with the invention is particularly suited for such resilient suspension because all chambers through which people can walk or which are taken up by shock-sensitive apparatus and systems must in any case be suspended from the rigid basic structure. For the purpose of resilient suspension it is only necessary for shock dampers to be incorporated in the suspension elements in order to ensure the desired shock damping throughout.

In order to provide a ship's superstructure of modular construction the containers and the longitudinal passage and supply elements expediently have a unit dimension corresponding to the spacing of the transverse trussed girders. Furthermore, it is expedient for the containers to have the standardised dimension or an integral multiple of this standardised dimension in the sideways direction. With this arrangement provision can in particular be made for the containers to be provided with one, two and three times the unit dimension.

The invention will now be described in the following by way of example with reference to the drawings which show:

BRIEF DESCRIPTION OF THE DRAWING

FIG. 1 a schematic partly sectioned sideview of a catamaran-type air cushion craft in accordance with the invention, FIG. 2 a partly sectioned schematic plan view of the catamaran-type air cushion craft of FIG. 1 on the line II—II of FIG. 1, FIG. 3 a partly sectioned schematic plan view of the catamaran-type air cushion craft of FIG. 1 on the line III—III of FIG. 1, FIG. 4 a schematic cross-section of a catamaran type air cushion craft in accordance with the invention, FIG. 5 a schematic perspective illustration of a double transverse trussed girder 217 with a single transverse trussed girder 218 attached thereto at a distance, FIG. 6 a front view of a single transverse trussed girder 218 or 231 in accordance with the invention, with the illustration being broken away at the right hand side, FIG. 7 a section on the line VII—VII in FIG. 6, FIG. 8 a twice interrupted or broken away front view of a double transverse trussed girder 217 or 230 in accordance with the invention, FIG. 9 a section on the line IX—IX of FIG. 8, FIG. 10 a schematic fragmentary view similar to FIG. 9 to illustrate the movability and fixability of the container 214 on a double transverse trussed girder 217, FIG. 11 a view in the direction of the arrow XI in FIG. 10, FIG. 12 a schematic view in the direction of the arrow XII in FIG. 10, FIG. 13 a schematic perspective view of a transverse passageway 234 with longitudinal passageway connections 235, FIG. 14 a schematic perspective view analogous to FIG. 13 of a further advantageous embodiment, FIG. 15 the detail XV of FIG. 14 in an enlarged sectional view, FIG. 16 a cross-section of a container 214''' containing a vertical communication path with laterally attached longitudinal passageways 236 shown in a partially sectioned representation, FIG. 17 a partially sectioned schematic sideview of two double transverse trussed girders 217, 230 arranged above one another with containers 214''' suspended thereon, with the containers 214''' containing a vertical communication path 239, FIG. 18 a schematic perspective view of a preferred longitudinal passageway, and FIG. 19 a perspective view of a further embodiment of a longitudinal passageway such as can be arranged between two transverse trussed girders which follow one another in a longitudinal direction.

DETAILED DESCRIPTION OF PREFERRED EMBODIMENTS

In the following description the same reference numerals are always used for the same components or for components which correspond to one another.

As seen in FIGS. 1 to 4 a catamaran-type air cushion craft in accordance with the invention has two floats or hulls 211 which are parallel to one another and which, together with front and rear air sealing skirts 242, 243 which extend between them and also a lower transverse deck 216, bound an air cushion chamber 210 above the low lying air cushion waterline 207 or the displacement mode waterline 208 or an intermediate waterline, for example 206 lying therebetween. At their top sides the floats 211 are connected with one another by a double transverse trussed girder 217. On some of the double transverse trussed girders 217 there are secured upper double transverse trussed girders 230 which are shorter in length and disposed symmetrically to the central longitudinal axis 205 of the ship. In addition the floats 211 are connected at the top by single transverse trussed girders 218. Upper single transverse trussed girders 231 of shorter length are secured on some of the single transverse trussed girders 218 symmetrically to the central longitudinal axis 205 of the ship.

Between each pair of double transverse trussed girders 217 of the lower storey 203 (FIG. 1) there is disposed, as seen in the longitudinal direction of the ship in accordance with FIGS. 1 to 5, a single transverse trussed girder 218. In the upper storey 204 an upper single transverse trussed girder 231 is provided at the first, third and fourth positions and a single upper double transverse trussed girder 230 is only provided at the second position.

Each double transverse trussed girder 217, 230 consists of two single trussed transverse girders arranged at a small spacing in the longitudinal direction of the ship and rigidly connected to one another. These single transverse trussed girders are built-up from a constructional point of view in exactly the same way as the single transverse trussed girders 218, 231.

As can be seen in particular from FIGS. 4 to 9 the single transverse trussed girders 218, 230 and the single girders of the double transverse trussed girders 217, 230 consist of a top chord 221 and a bottom chord 222 between which struts or trusses 223 are arranged. The trusses 223 extend however in the width direction of the ship only over trussed sections 219 between which longitudinal passage sections 220 are provided, through which the horizontal communication paths extending in the longitudinal direction of the ship can be laid.

Figure 4:
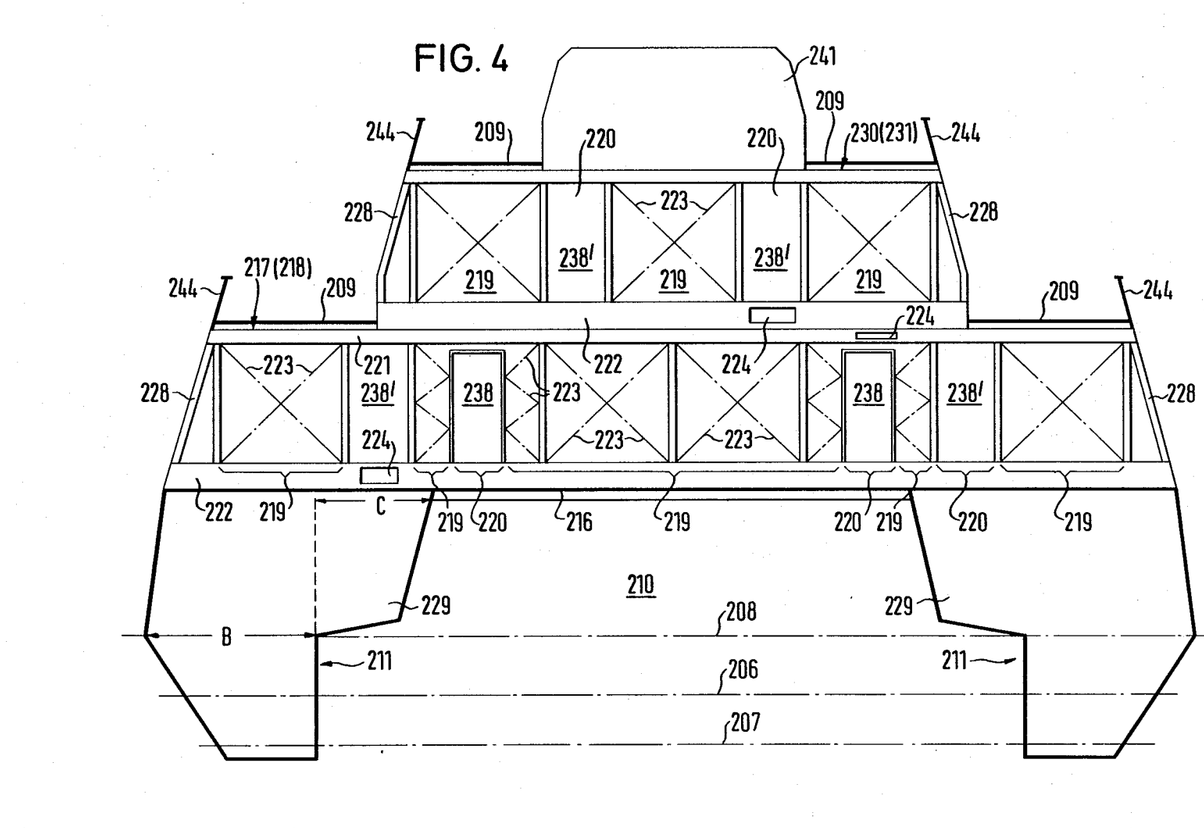
Figure 5:
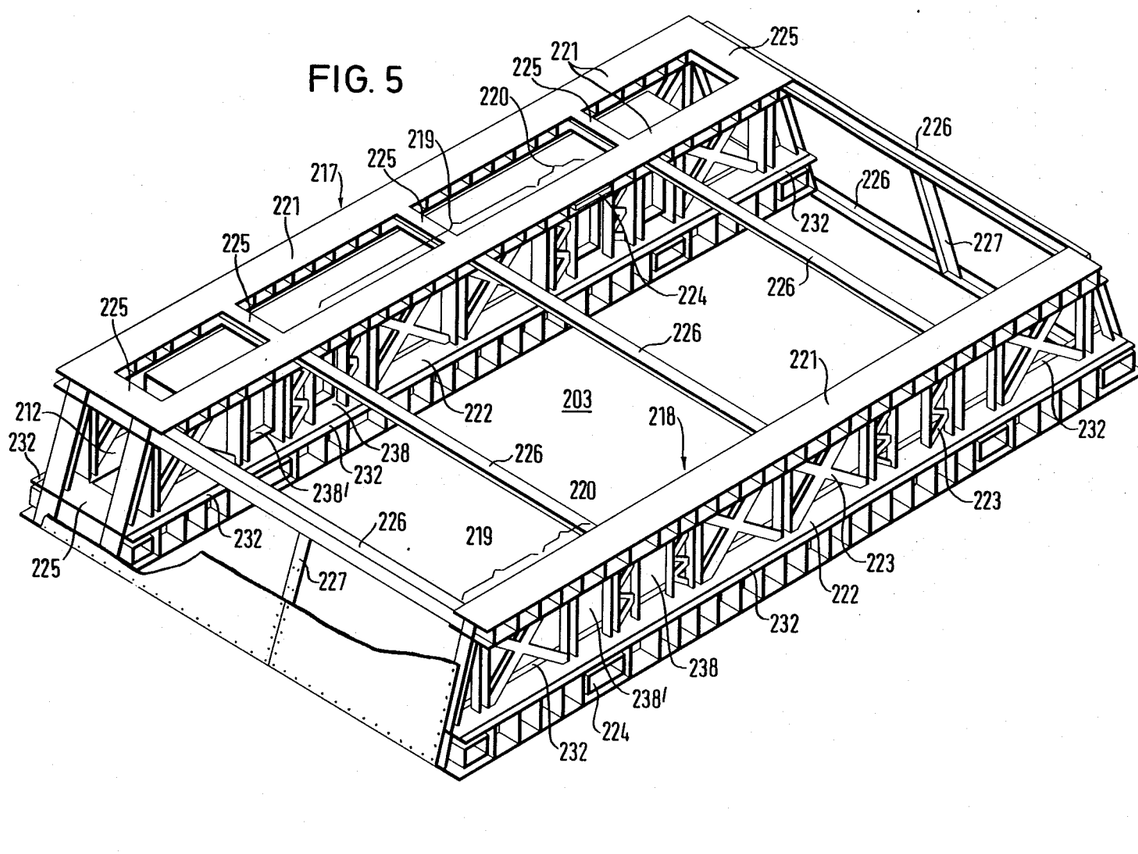
Figure 6:
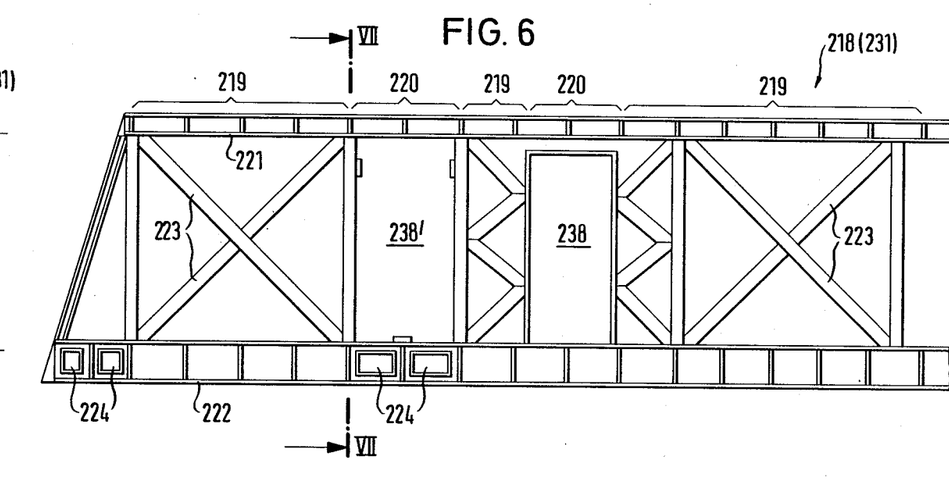

As seen in FIGS. 4 and 5 longitudinal passages 224 for conduits are provided in the upper and lower chords 221, 222, preferably in the region of the longitudinal passage sections 220.

As seen in FIG. 4 there are both longitudinal passage sections 220 with door openings 238 for the purpose of access to the containers which have yet to be described, and passageway openings 238' from which longitudinal passageways branch off which extend over practically the whole length of the storey.

Figure 9:
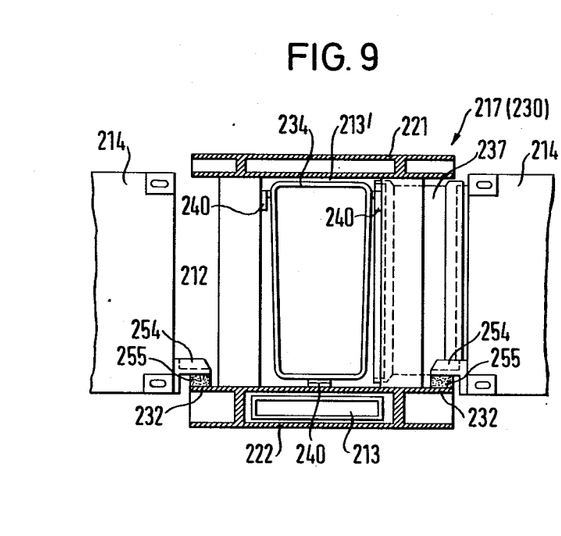

As seen in FIGS. 1 to 8 transverse hollow cavities 212 for passageways are left within each double transverse trussed girder 217 or 230 in which transverse passageways 234 which are closed all around their periphery in accordance with FIG. 9 can be suspended via resilient shock absorbers or vibration dampers 240, with the width and height of the transverse passageways 234 being dimensioned so that people can walk comfortably through them.

Inside the double transverse trussed girders 217, 230 there are provided line accommodating cavities 213, 213' at the top and at the bottom, as seen in FIG. 9, with a subdivision expediently taken place in such a way that the liquid and gas conveying lines are laid in the lower line accommodating cavity, while the electrical lines are laid in the upper line accommodating cavity 213'.

Figure 1:
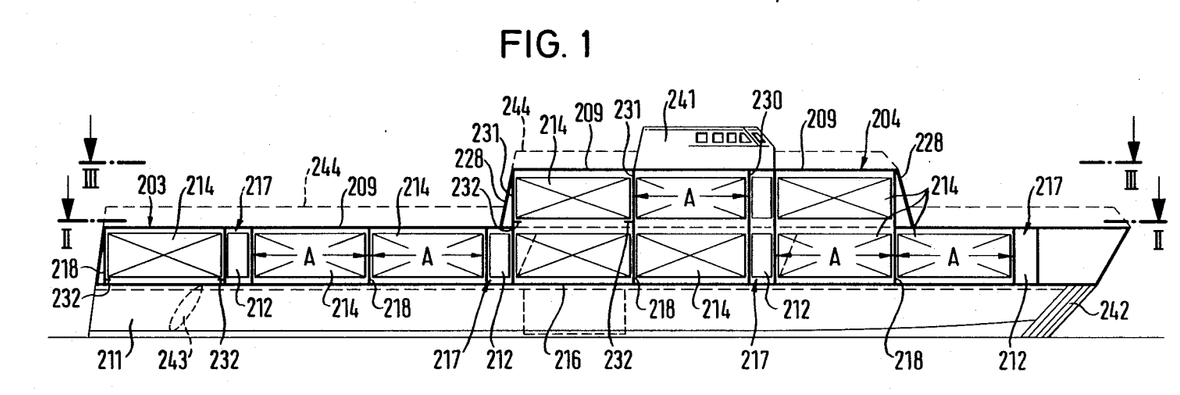
Figure 2:
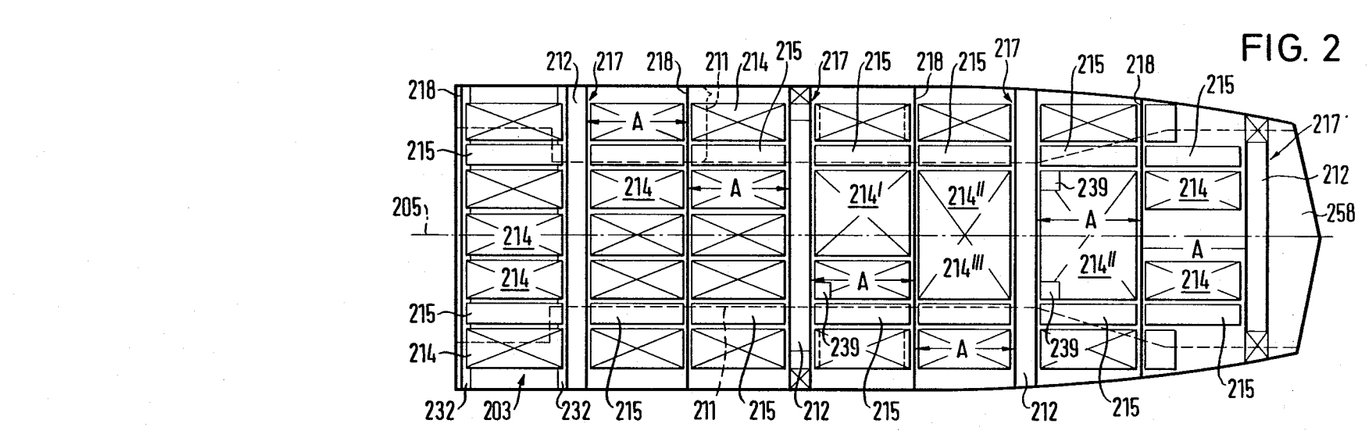
Figure 3:
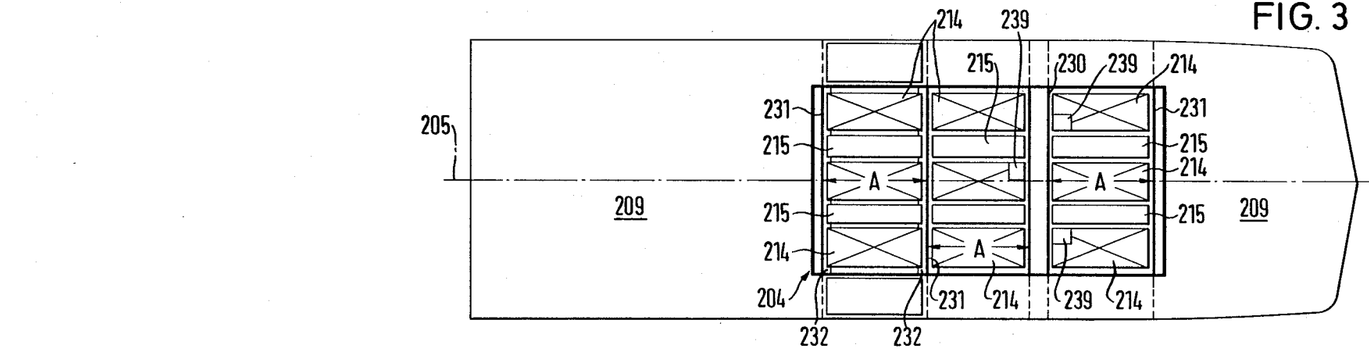

As seen in FIGS. 1 to 3 a double transverse trussed girder 217 and a single transverse trussed girder 218 are in each case arranged one behind the other in the lower storey 203 at uniform intervals in the longitudinal direction of the ship, so that a total of four transverse hollow cavities 212 with transverse passageways 234 arranged therein (FIGS. 9, 17) are present. In the upper storey on which the bridge module is secured there is located only one upper double transverse trust 9irder 230, while the remaining transverse trussed girders are upper single transverse trussed girders 231.

At the top the basic body defined by the transverse trussed girders 217, 218, 230, 231 is closed or clad in water-tight manner by transverse decks 209 at positions where at the top there is no storey located thereabove (for example 204 or 241). Bullwarks 244, which are only indicated in broken lines in FIG. 1, extend all around the upper transverse deck 209.

As seen in FIGS. 1 to 3 the longitudinal intermediate spaces A between sequential transverse trussed girders 217, 218 or 230, 231 are all of the same length so that correspondingly dimensioned standardised containers 214 can be arranged therebetween. The height of each container 214 corresponds essentially to the height of the transverse trussed girders 217, 218, 230, 231.

The breadth of the containers 214 also corresponds, in accordance with FIG. 2, to a unit measure, however containers 214' which are twice as broad, or containers 214" which are three times as broad, can also be provided.

As seen in FIGS. 5 to 12 transverse rails 232 are arranged at the bottom on the transverse trussed girders 217, 218, 230, 231 at the side facing the containers 214, but also in non-illustrated manner at the top, along which, as seen in FIGS. 1 to 3, 5, 10 to 12 running rollers 233 provided at the stem and stern of the containers 214 can roll.

Figure 10:
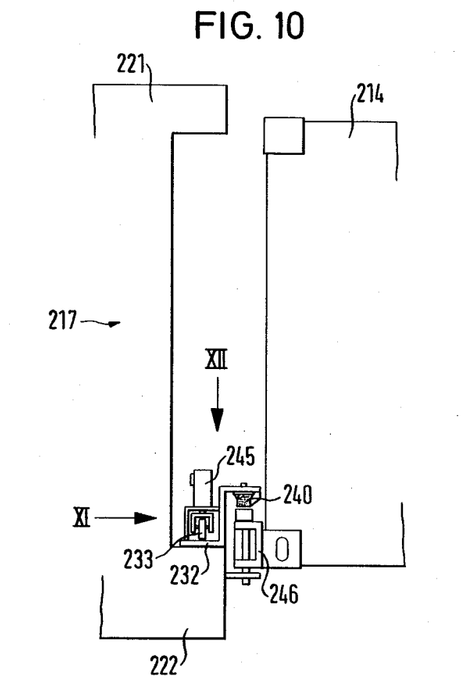
Figure 11:
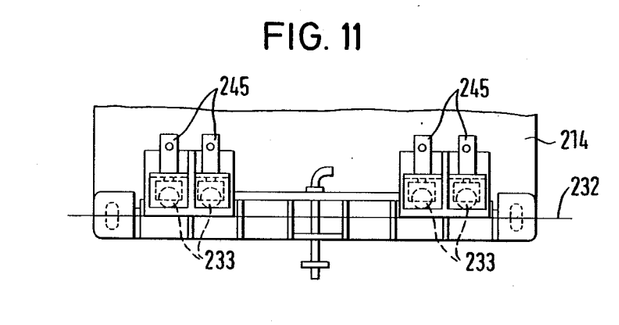
Figure 12:
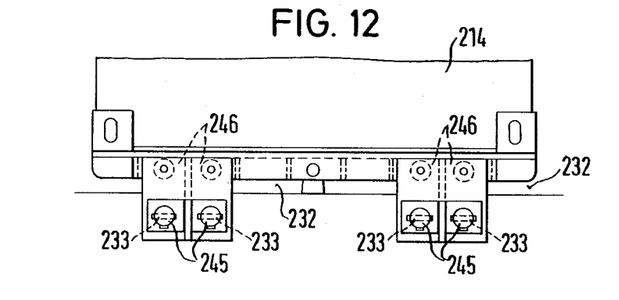

The running rollers 233 can be extended downwardly or retracted by means of hydraulically actuated lifting devices 245 (FIGS. 10 to 12).

On retracting the rollers the containers 214 sink, in accordance with FIGS. 10 to 12, onto solid foundations 246 which can also include vibration dampers 240'.

As seen in FIGS. 1 to 3 and 5 the rails 232 extend along the entire length of the transverse trussed girders 217, 218, 230, 231. In FIGS. 1 to 3 the transverse rails 232 are only schematically illustrated at some positions.

As seen in FIGS. 2 and 3 longitudinal passage elements and supply elements 215 are arranged between the transverse trussed girders 217, 218, 230, 231 and the containers 214 and, in conjunction with the transverse cavities 212 represent the horizontal communication paths.

As seen in FIG. 4 a continuous air-tight transverse deck 216 extends beneath the transverse trussed girders 217, 218 between the floats 211. Transverse deck 216 merely serves for sealing purposes and takes on practically no support or stabilising functions.

As can be seen particularly clearly from FIG. 5 the two single transverse trussed girders which together form the double transverse trussed girder 217 or 230 are connected with one another at the top and at the bottom by longitudinal connectors 225 to form a torsionally stiff constructional unit.

The spaced apart double and single transverse trussed girders 217, 218 and 230, 231 are connected together in the longitudinal direction by longitudinal girders 226 which however are only provided at the top and at the bottom so that the containers 214 and the longitudinal passage and supply elements 215 can be introduced from the side. Vertical supports 227 arranged at the centre between the transverse trussed girders 217, 218 for stabilisation are removable in order to enable the passage of the containers to the inner space.

The basic skeleton which is formed in this way is closed off in water-tight manner at the outside by panels 228.

As can be seen particularly clearly from FIG. 5 no deck is present in certain regions above the lower storey 203 formed by the transverse trussed girders 217, 218. There the narrower and shorter upper storey 204 is attached. In similar manner no intermediate deck is present between the upper storey 204 and the bridge module of FIG. 1. Accordingly, vertical passageways are present between the individual girders 217, 218, 226 which can be exploited in a manner which will be described later to provide vertical communication paths. In other respects the upper surfaces which border on the external atmosphere are clad by water-tight transverse decks 209 which can be walked on.

As seen in FIG. 4 the floats 211 have laterally inwardly projecting projections 229 in the upper half, or in the upper third which substantially broaden the support base for the transverse trussed girders 217, 218, and considerably reduce the space which must be freely bridged by the transverse trussed girders 217, 218 or by the sealing deck 216.

The largest width B below the inner projection 229 is, as seen in FIG. 4, somewhat larger than the width of the projection 219 directly beneath the transverse trussed girders 217, 218 attached to the transverse bulkheads of the floats 211.

Figure 13:
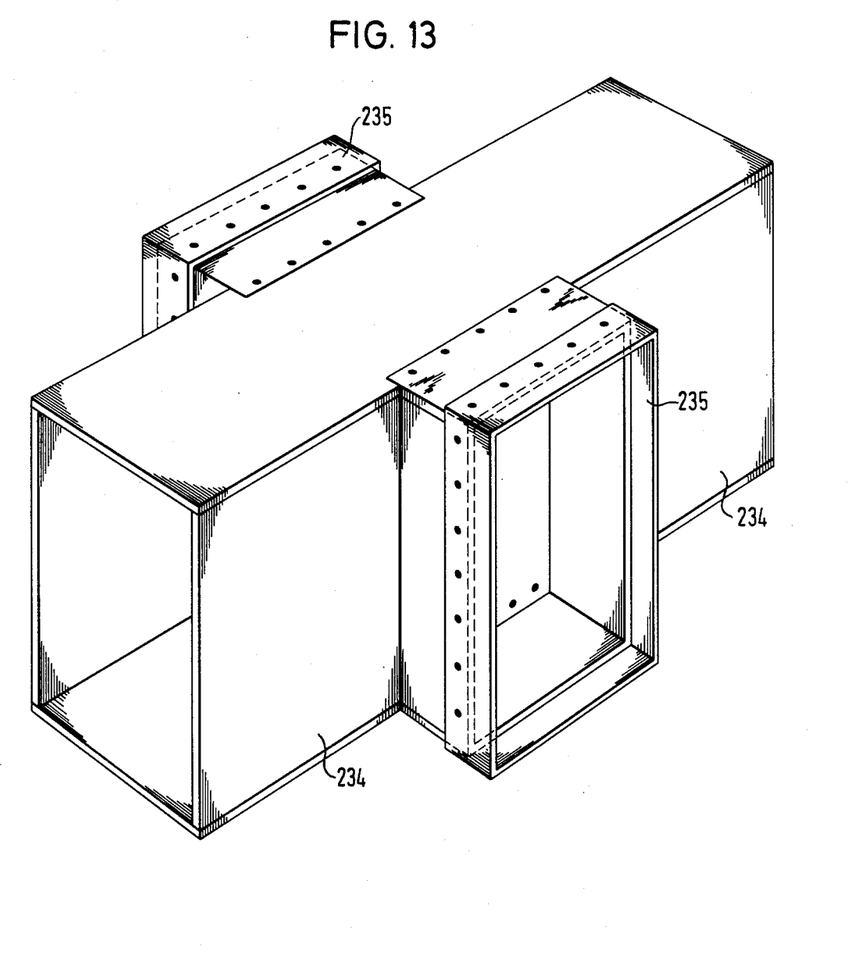
Figure 14:
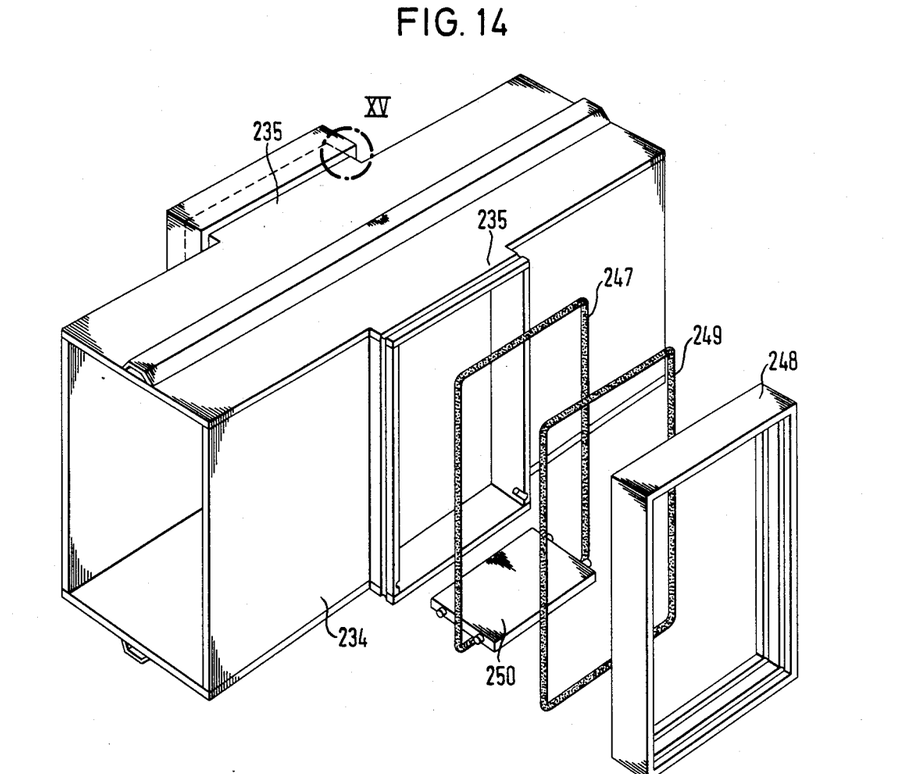
Figure 15:
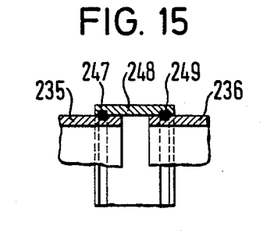

As seen in FIG. 13 the box-like transverse passageways 234 which are resiliently arranged within the double transverse trussed girders 217, 230 are provided with longitudinal passageway connections 235 at the positions where longitudinal passage elements and supply elements 215 branch off. Whereas FIG. 13 shows a rigid longitudinal passageway connection 235, FIGS. 14 and 15 show a way in which a movable attachment of the longitudinal passage and supply elements 215 is possible to a certain degree, for example for movement through a few centimeters. For this purpose a round rubber 249 is laid around the actual longitudinal passage connection 235 onto which a connection frame 248 is pushed from the longitudinal passage side.

The adjoining longitudinal passageway 236 in the longitudinal direction of the ship (FIGS. 14, 18, 19) is likewise surrounded at its end facing the transverse passageway 234 by a round rubber 247 onto which the connection frame 248 is likewise pushed. At the floor a movable transition member 250 is provided between the longitudinal passage connection 235 and the longitudinal passageway 236. In this way, depending on the design of the thickness of the round rubbers 247, 249 and of the gap between the connection frame 248 and the longitudinal passage connection 235 of the longitudinal passageway 236 relative movements of up to 7 cm can be compensated for.

Figure 16:
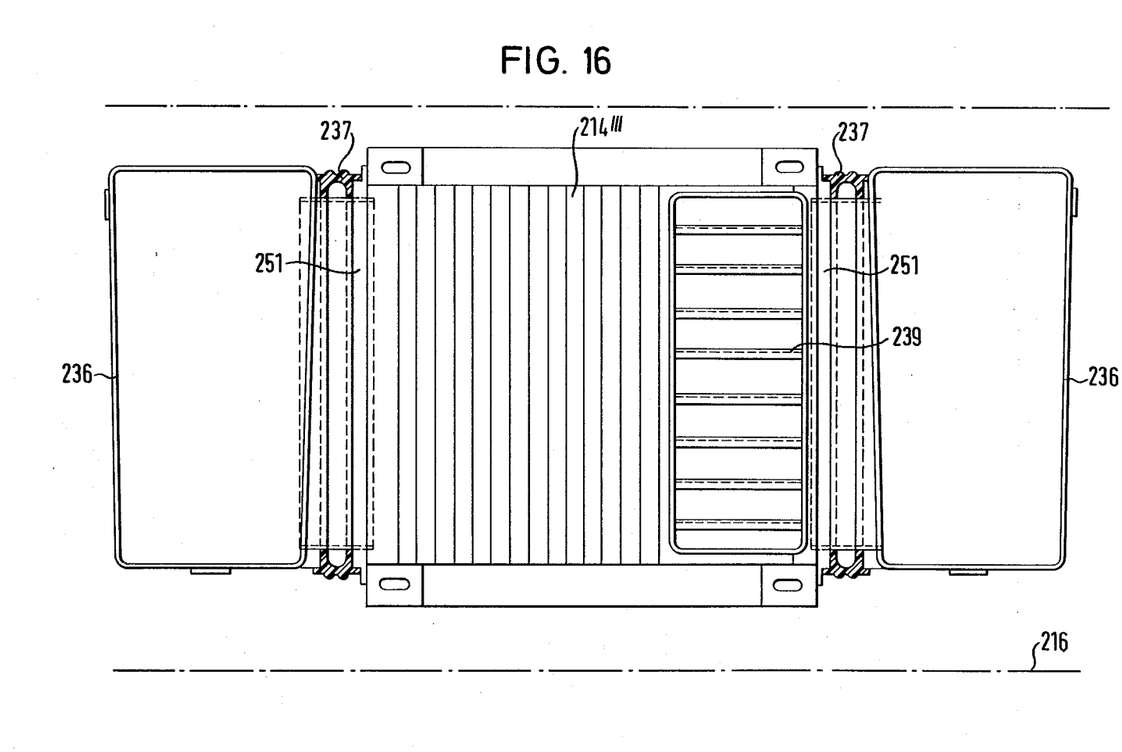

FIG. 16 shows a cross-section through a container 214''' having a communication path in the form of a stairway 239 to which longitudinal passageways 236 are so attached via lateral openings 251 and resilient intermediate pieces 237 that the interior of the container 214''' can be entered through the openings and the intermediate pieces 237.

Figure 17:
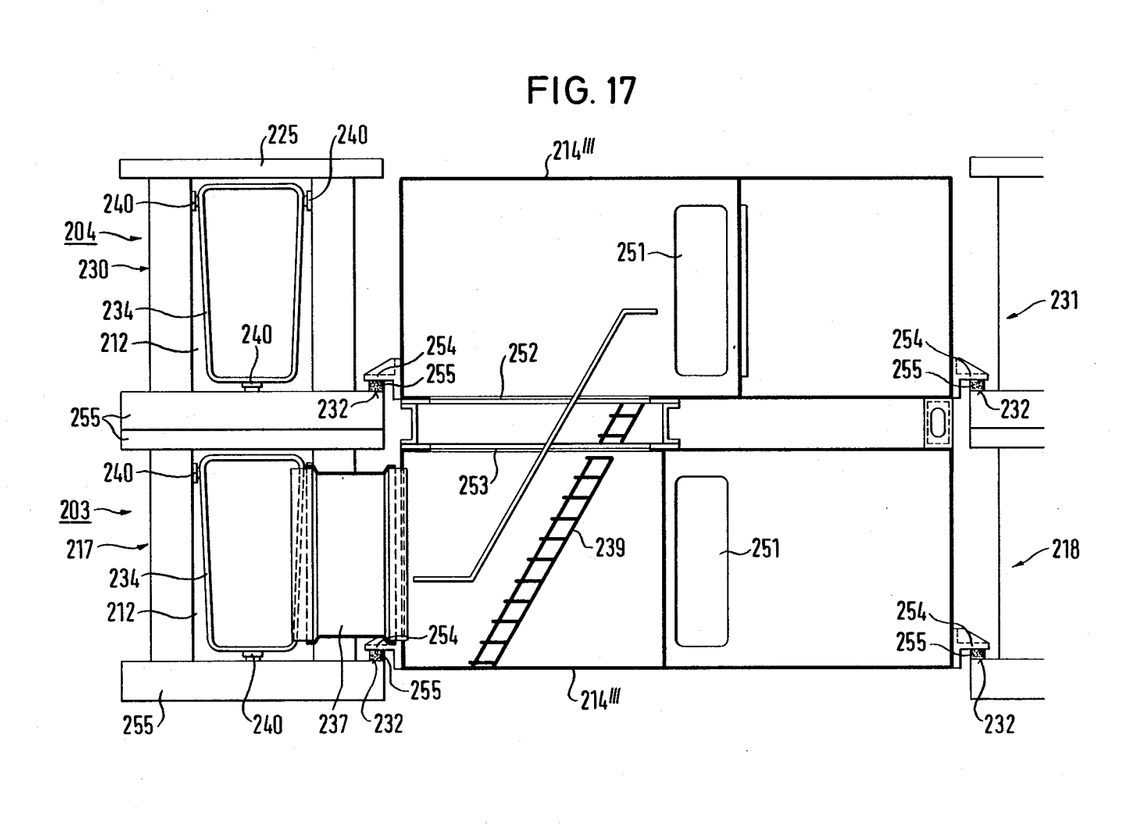

As seen in FIG. 17 the stairway 239 extends through horizontal openings 252, 253 in the floor or in the ceiling of two containers 214''', which lie above one another, so that in this way a vertical communication path is ensured between the two storeys 203, 204 which are defined by the transverse trussed girders 217, 218 and 230, 231.

Figure 7:
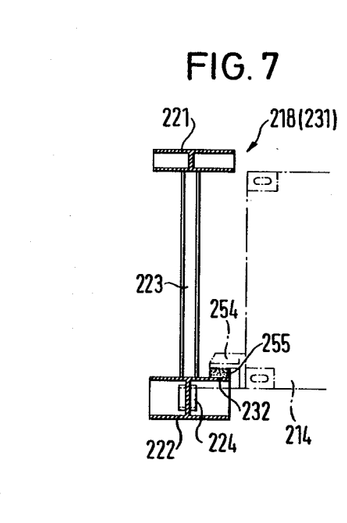
Figure 8:
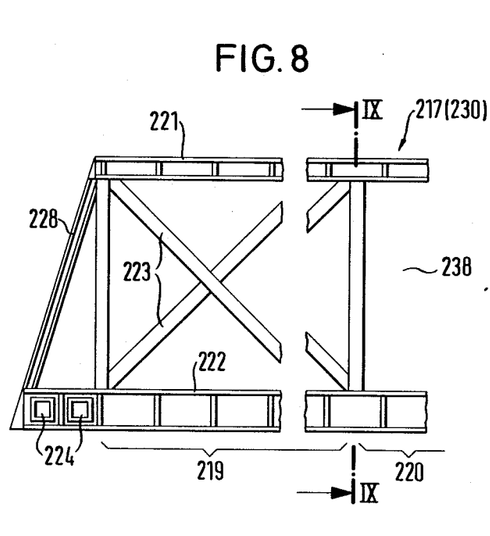

FIG. 17 indicates, in the same way as FIGS. 7 and 9, how the containers 214, 214', 214", 214''' can be resiliently braced via lateral outriggers 254 and resilient members 255 on the transverse rails 232, or on other counter-supports, after they have been brought into position by means of running rollers 233 or in some other manner.

Figures 18, 19:
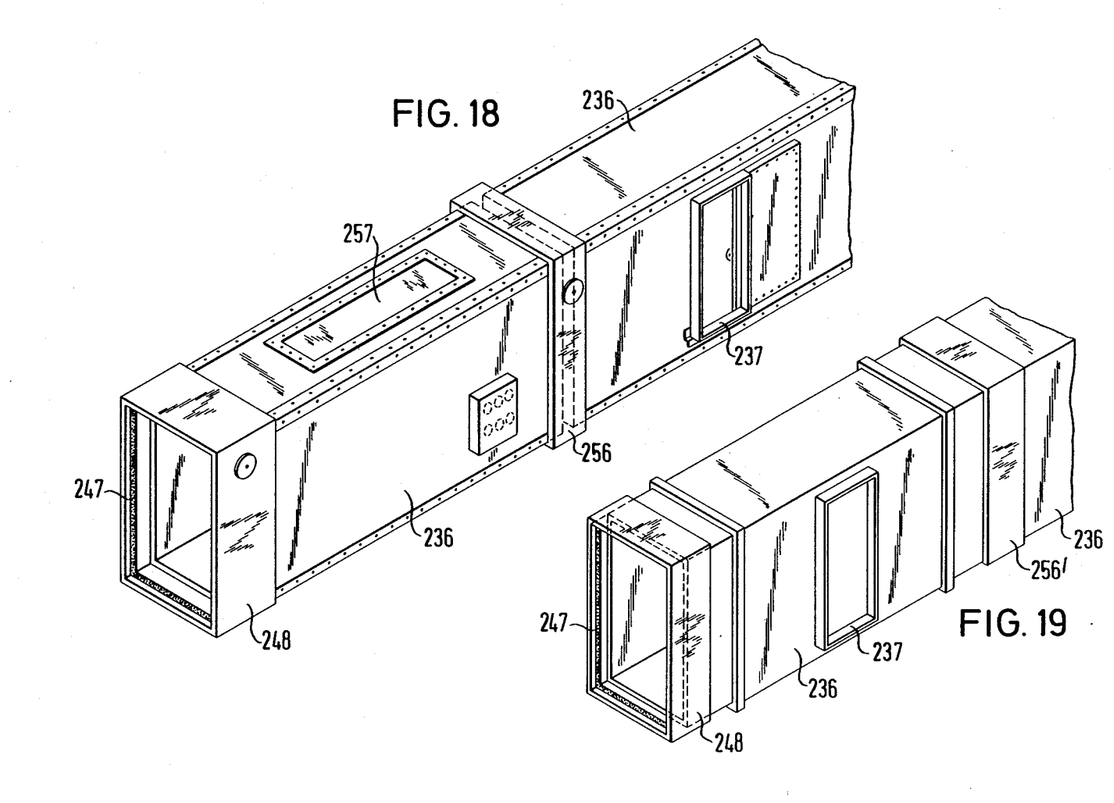

FIGS. 18 and 19 show two embodiments of longitudinal passageways 236 which are arranged as longitudinal passage and supply elements 215 between sequential transverse trussed girders 217, 218, 230, 231, and which can be connected with the longitudinal passageway connections 235.

FIG. 18 shows a connection by means of a connection frame 248 as is illustrated in detail in FIG. 14. Individual shorter sections of longitudinal passageways 236 can be connected with one another by connection frames 256 to larger units in the longitudinal direction.

By way of example removable installation and repair covers 257 can be arranged in the ceilings of the longitudinal passageways 236. Openings 237 for the passage of containers are moreover provided in the sidewalls of the longitudinal passageways 236.

As seen in FIG. 19 two sections of a longitudinal passageway 236 are connected with one another into a larger constructional unit by a rigid and integral frame 256'.

In accordance with the invention the transverse trussed girders 217, 218 are so dimensioned that six standardised containers can be suspended alongside one another and so that room still remains for two longitudinal passageways 236 with a passageway width of 1.2 m. As a result of this modular raster arrangement a simple structure results which offers a whole range of possibilities of variation both in length, in width and also in height.

It is also of particular significance that each transverse trussed girder 217, 218, 230, 231 has the height of a storey 203, 204 within the ship's superstructure whereby the possibility of the building of a second storey is possible, simply by arranging two transverse trussed girders above one another. If necessary, a third or fourth storey could also be provided in corresponding manner.

The cladding of the structure against the weather by means of the panels 228 and the transverse decks 209, 216 preferably takes place with the aid of light auxiliary girders which are attached to the connection beams. The panels 228 are mounted at an angle, i.e. angled in the longitudinal direction of the ship. Furthermore, the length of the panels should correspond to the distance between the centres of the transverse trussed girders which follow one another. The panel width is predetermined by the height of the storey with account being taken, if neccesary, of an intended side inclination of the outer walls.

The interior of the watercraft of the invention is thus built-up entirely on modular principles. There remains only a few small systems, merely in the side hulls or floats 211, which are locally assembled; in the same way the connection lines for fluids, gases and electricity are installed in the customary manner.

The introduction of the containers 214 preferably takes place from the side along the transverse rails 232, with the containers 214 first being moved on the running rollers 233 and then being lowered in position and being connected via resilient intermediate members 240', 255 securely to the transverse trussed girders 217, 218, 230, 231. The containers 214 are in this manner resiliently suspended. If one requires larger chambers then two containers 214 can be rigidly connected together to form a unit 214', whereby one can omit the adjoining sidewalls of the two containers 214.

By carrying out the system of the invention in consequential manner the entire inner chamber used by humans and also the space taken up by the sensitive technical apparatus is protected against shock and vibration. In the event of an underwater explosion this type of assembly results, in combination with the likewise shock-absorbing air cushion in a high quality inherent protection for the marine craft.

As seen in FIG. 2 a space 258 is left free between the two frontmost side containers 214 in which, for example, a deck weapon can be mounted, with a corresponding platform being provided.

The transverse trussed girders 217, 218, 230, 231 are preferably executed as welded steel constructions, can however also consist of glass fibre reinforced plastic, in particular for light craft.

I claim:

1. A catamaran-type marine craft comprising: two floats, arranged spaced apart parallel to each other, extending in the direction of travel of the craft, and having top portions; a connection structure connecting said two floats together at said top portions; a transverse deck sealing said connection structure at a bottom portion thereof; said connection structure including a plurality of transverse trussed girders arranged parallel to each other transverse to the direction of travel and each having a front side and a rear side, the front side of each girder being spaced from the rear side of the adjacent girder by a distance sufficient to provide therebetween a space for at least one row of containers and for at least one supply element; at least one row of containers and at least one supply element in said space and carried by said girders; at least two of said transverse trussed girders being double trussed girders; each double trussed girder consisting of two single trussed girders having such a height and a such a distance from each other so as to form a passageway sufficiently large for persons and a passageway for supply lines; said passageways for persons being means for providing access to said containers and said at least one supply element; said trussed girders absorbing all forces to which said floats are subjected.

2. A marine craft according to claim 1, wherein said connection structure includes single transverse trussed girders arranged between at least some of said double transverse trussed girders.

3. A marine craft according to claim 1, wherein said double transverse trussed girders and said single transverse trussed girders are alternately mounted in the direction of travel of the craft.

4. A marine craft according to claim 3, comprising more than two double transverse trussed girders, the distance between the transverse trussed girders being the same.

5. A marine craft according to claim 4, wherein the containers and the longitudinal passage and supply elements have a unit dimension in the longitudinal direction of the craft which corresponds to the spacing of the transverse trussed girders.

6. A marine craft according to claim 3, wherein the containers and the supply elements are mounted at the front and rear sides of the transverse trussed girders.

7. A marine craft according to claim 3, wherein the containers and the supply elements are introduceable from at least one side transverse to the direction of travel between two transverse trussed girders.

8. A marine craft according to claim 3, wherein each transverse trussed girder has a top chord, a bottom chord and trusses arranged therebetween.

9. A marine craft according to claim 8, wherein line conveying passages are provided in the top chord and/or in the bottom chord.

10. A marine craft according to claim 3, wherein each transverse trussed girder has trussed sections and passage sections.

11. A marine craft according to claim 3, comprising more than two longitudinally spaced double transverse trussed girders, connected rigidly together by longitudinal girders.

12. A marine craft according to claim 11, wherein the longitudinal girders are only arranged at the top and the bottom in such a way that the containers and the supply elements are introduceable between them from the side.

13. A marine craft according to claim 12, wherein removable vertical supports are arranged between the girders at the sides.

14. A marine craft according to claim 13, wherein a basic skeleton formed by the transverse trussed girders and the longitudinal beams is clad at a top by a transverse deck in a water-tight manner so that it can be walked on only where there is no adjoining upper storey or bridge module.

15. A marine craft according to claim 3, wherein transverse running rails for running in and running out, and optionally for securing of the containers, and/or of the supply elements, are provided at the front and/or rear sides of the transverse trussed girders.

16. A marine craft according to claim 15, wherein the containers, and/or the longitudinal passage and supply elements, are provided with liftable and lowerable running rollers for the associated transverse running rails.

17. A marine craft according to claim 1, wherein longitudinal connectors are provided at top and bottom between the single transverse trussed girders at transverse intervals.

18. A marine craft according to claim 1, without decks other than the transverse deck in the connection structure which only serves for sealing, and intermediate floors arranged only at certain specific positions between the containers and the supply elements.

19. A marine craft according to claim 1, without longitudinal walls and/or transverse bulkheads in the connection structure, other than intermediate walls at certain specific positions between the containers and the supply elements.

20. A marine craft according to claim 1, wherein the connection structure is sealed off in water-tight manner at sides, stem, and stern by panels.

21. A marine craft according to claim 20, wherein the panels at the sides are so subdivided that the panels are removable in sections for lateral introduction or removal of containers and the supply elements.

22. A marine craft according to claim 1, wherein the floats have an inwardly directed projection in an upper region against which the transverse trussed girders and the transverse deck are braced at a top.

23. A marine craft according to claim 22, wherien the projection is, at most, approximately as wide as the float.

24. A marine craft according to claim 22, wherein at least one trussed section and one longitudinal passage section are provided at a side vertically above the associated float.

25. A marine craft according to claim 22, wherein 40 to 50%, in particular 45 to 50%, of the length of each transverse trussed girder is arranged above an intermediate space between the floats, with the remainder of the length being arranged vertically above the floats.

26. A marine craft according to claim 1, wherein upper double and single transverse trussed girders are mounted on the trasverse trussed girders and are of similar constructions, but shorter.

27. A marine craft according to claim 26, wherein the shorter, upper, double and single transverse trussed girders are sufficiently long to extend vertically above the floats.

28. A marine craft according to claim 26, wherein vertical communication paths are provided between containers which are arranged above one another.

29. A marine craft according to claim 1, wherein the double transverse trussed girders contain transverse passageways which are closed on all sides.

30. A marine craft according to claim 29, wherein longitudinal passageway connections are arranged on the transverse passageways in a region of longitudinal passage sections.

31. A marine craft according to claim 30, wherein longitudinal passageways are sections to the longitudinal passage connections.

32. A marine craft according to claim 31, wherein the containers, the transverse passageway and the longitudinally passageways are resiliently suspended on the transverse trussed girders.

33. A marine craft according to claim 29, wherein openings to adjoining containers branch off from the transverse passageways and/or from the longitudinal passageways.

34. A marine craft according to claim 33, wherein the container openings are constructed as passage sections.

35. A marine craft according to claim 1, wherein the containers have a unit dimension, or an integral multiple of said unit dimension, in lateral direction.

36. A marine craft according to claim 35, wherein the containers are provided with one, two and three times the unit dimension.

37. A marine craft according to claim 1, wherein one or more of the containers are omitted and a platform is provided in their place on which, or at which, a standardized operating system such as a weapon, a position finding apparatus, or the like is arranged.

* * * * *